(12) United States Patent
Muramatsu et al.

(10) Patent No.: US 6,282,885 B1
(45) Date of Patent: Sep. 4, 2001

(54) GAS TURBINE ENGINE

(75) Inventors: Hironori Muramatsu; Masaaki Endou, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/514,187

(22) Filed: Feb. 28, 2000

(30) Foreign Application Priority Data

Feb. 26, 1999 (JP) .................................................. 11-096730

(51) Int. Cl.⁷ ....................................................... F02C 9/26
(52) U.S. Cl. ........................................................... 60/39.281
(58) Field of Search .............................. 60/39.281, 39.03, 60/747

(56) References Cited

U.S. PATENT DOCUMENTS

| | | | |
|---|---|---|---|
| 4,716,719 | * 1/1988 | Takahashi et al. | 60/39.281 |
| 5,272,637 | * 12/1993 | Urushidani et al. | 60/39.281 |
| 5,806,299 | * 9/1998 | Bauermeister et al. | 60/39.281 |
| 6,092,362 | * 7/2000 | Nagafuchi et al. | 60/39.281 |

* cited by examiner

Primary Examiner—Michael L. Koczo
(74) Attorney, Agent, or Firm—Arent Fox Kintner Plotkin & Kahn, PLLC

(57) ABSTRACT

Is disclosed a gas-turbine engine capable of changing two different fuel-combustion stages from diffuse combustion to premixed combustion and reverse without variation in its rotation speed, in which a first stage of supplying a specified flow of fuel for diffuse combustion to a combustion chamber through a first injection nozzle and a second stage of supplying a specified flow of fuel for premixed combustion to the combustion chamber through a second injection nozzle are changed to each other according to a criterion based on a specified rotation speed and load state, and which is therefore provided with means for applying air purging to a nozzle of a fuel-supply cutoff line and means for restricting a flow rate of fuel to a nozzle of a currently working line for a certain period.

1 Claim, 4 Drawing Sheets

GAS TURBINE ENGINE

BACKGROUND OF THE INVENTION

The present invention relates to a gas turbine engine having a two-stage combustion changing system capable of changing the fuel combustion mode from diffuse combustion to premixed combustion and reverse in accord with its load conditions.

Typically, gas turbine engines of this type adopt two-stage combustion changing system that conducts diffuse combustion by feeding only fuel through a first inject nozzle into a combustion chamber (burner) to improve ignition and/or flame stability at the engine starting time or with a decreased load and conducts premixed combustion by feeding fuel premixed at a specified air-fuel ratio through a second injection nozzle into the combustion chamber to improve emission efficiency at a normal load.

In applying the two-stage combustion changing system, there arises such a problem that, when switching the combustion mode, temporal changes in rotation speed of the engine occur because a delay in feeding fuel occurs due to the capacity of a fuel gallery of a fuel-supply-side nozzle-line and fuel remaining in a fuel galley of a fuel-supply cutoff nozzle-line is purged together with air into the combustion chamber when conducting air-purging for preventing nozzle caulking in the nozzle.

The variation in rotation speed (the number of revolutions per minute) of the engine when changing the combustion mode can be prevented by shortening the length of the fuel gallery of each nozzle line to reduce the capacity of the gallery. However, it is very difficult to reduce the capacity of the gallery in practice because of severe limitations on layout of the fuel lines and nozzles, which must not be placed in the places where high heat radiation may arise. Actually, the variation in the rotation speed has not sufficiently been reduced.

The problem to be solved is such that a gas turbine with two-stage combustion changing system varies its rotation speed when changing the combustion mode because a delay in feeding fuel occurs due to the capacity of a fuel gallery of the fuel-supply-side nozzle-line and fuel remaining in a galley of a fuel-supply cutoff nozzle-line is purged together with air into the combustion chamber at the time of air-purging for preventing the nozzle from be caulked.

Accordingly, an object of the present invention is to provide a gas turbine engine having a two-stage combustion changing system that can change two combustion stages from the diffuse combustion to the premixed combustion and vice versa, effectively preventing the changes in engine rotation speed by using a means for carrying-out air-purging of a nozzle on the fuel-supply shutoff line simultaneously with changing a current combustion stage to the other and a means for restricting a fuel flow rate to a nozzle on a fuel-supply nozzle-line for a certain period.

PREFERRED EMBODIMENT OF THE INVENTION

Figure 1:
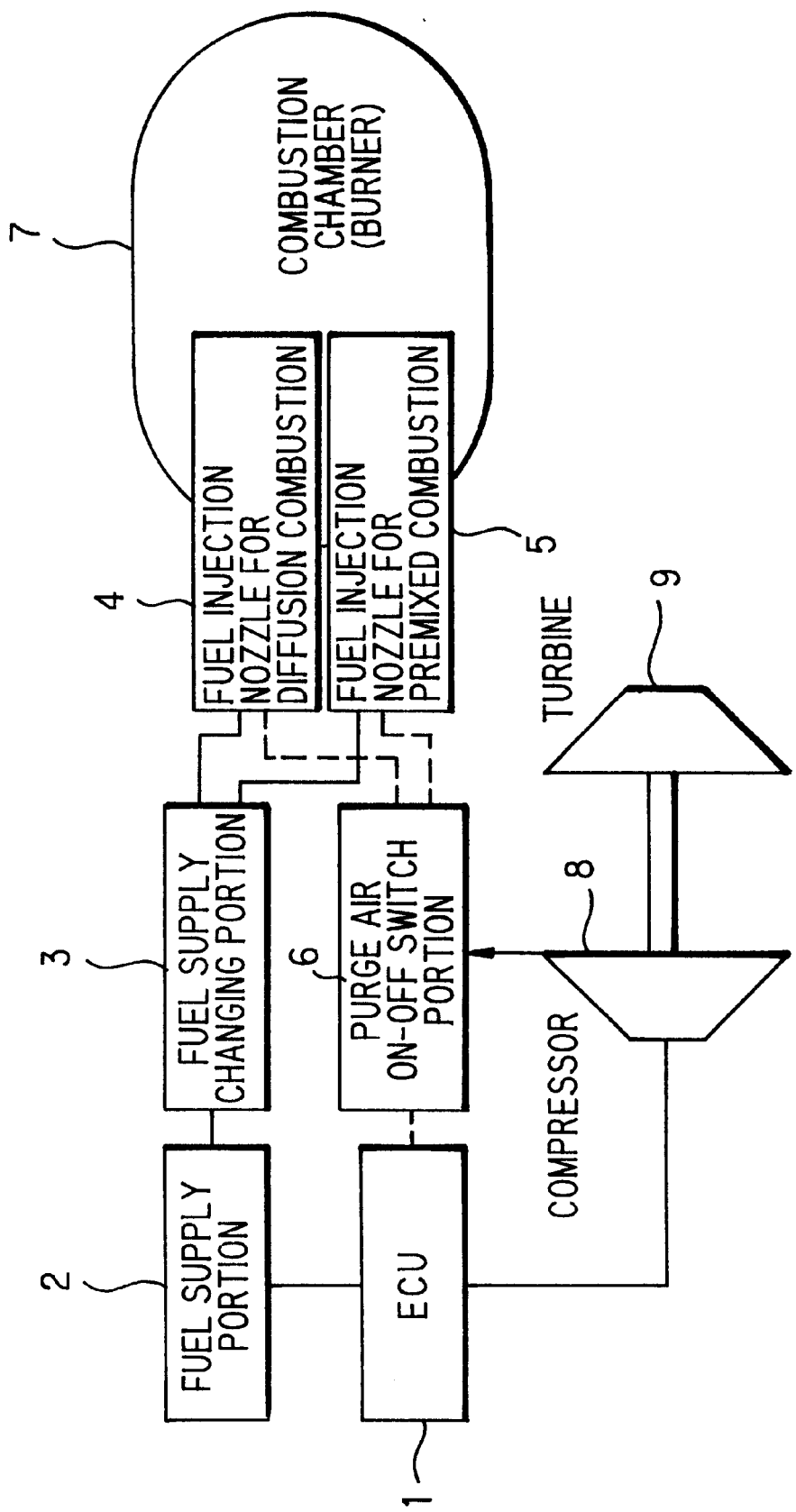
FIG. 1 is a block diagram of an exemplary control system of a gas turbine engine embodying the present invention.

FIG. 1 illustrates components of a control system of a gas turbine engine.

As shown in FIG. 1, the control system comprises a fuel supply portion 2 for supplying diffuse combustion fuel and premixed combustion fuel, a fuel supply changing portion 3 for selectively changing the fuel-supply line to a diffuse-combustion fuel nozzle 4 or a premixed-combustion fuel nozzle 5 and an air-purge ON-OFF switching portion 6 for selectively supplying purging air to either of the nozzles 4 and 5. Numeral 7 designates a combustion chamber (burner) and numeral 9 designates a turbine.

An electronic control unit (ECU) 1 controls the whole system and performs the feedback control of rotation of the engine so that the number of revolutions per minute of its rotor, detected by a revolution sensor, is regulated to a specified value.

The gas turbine according to the present invention is provided with a control means for alternatively switching over to the diffuse combustion stage or the premixed combustion stage, a control means for conducting the air-purging by feeding a specified amount of air to a used nozzle in a fuel-supply shutoff line simultaneously with changing the stage and a control means for restricting a flow rate of fuel to a usable nozzle in a fuel-supply line for a specified period.

The stage changing control and the air-purge control are realized in practice by the electronic control unit ECU 1 that, monitoring the rotation speed or the output (load) of the engine, decides to drive in time the fuel changing portion 3 and the air-purge ON-OFF switching portion 6.

Similarly, the control for restricting the fuel-flow rate to a specified level for a specified period is realized in practice by the ECU 1 that decide and drives in time the fuel supply portion 2 to regulate a flow rate of diffuse combustion fuel or a flow rate of premixed combustion fuel.

Figure 2:
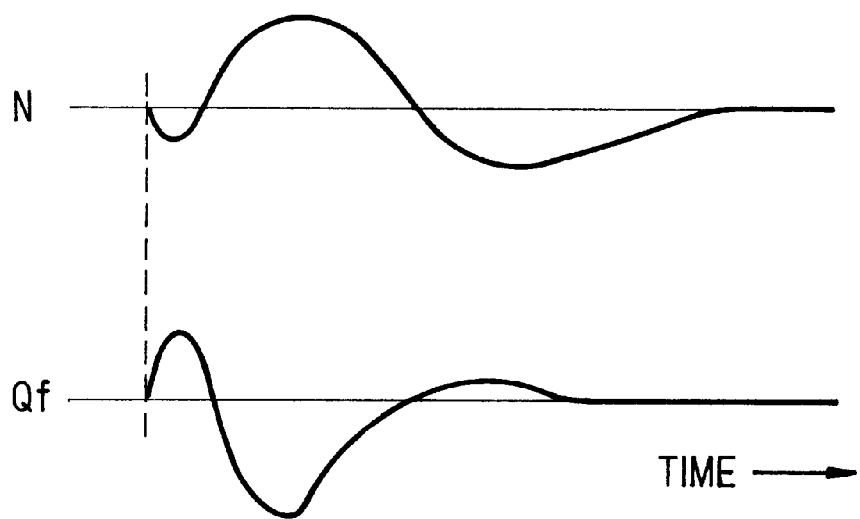
FIG. 2 illustrates characteristic curves showing changes in rotation speed N and changes in fuel flow rate Qf respectively when changing the combustion mode from the diffuse combustion to the premixed combustion without conducting air-purge of a fuel injection nozzle.

FIG. 2 shows changes in the number of revolutions N of an engine and changes in the fuel flow rate Qf when changing from the diffuse combustion to the premixed combustion without conducting the air purging of a used nozzle. In this instance, the number of revolutions of the engine temporally varies as the fuel flow rate varies, which is caused by a delay of fuel supply due to the capacity of fuel gallery of a premixed combustion fuel line with a nozzle 5.

Figure 3:
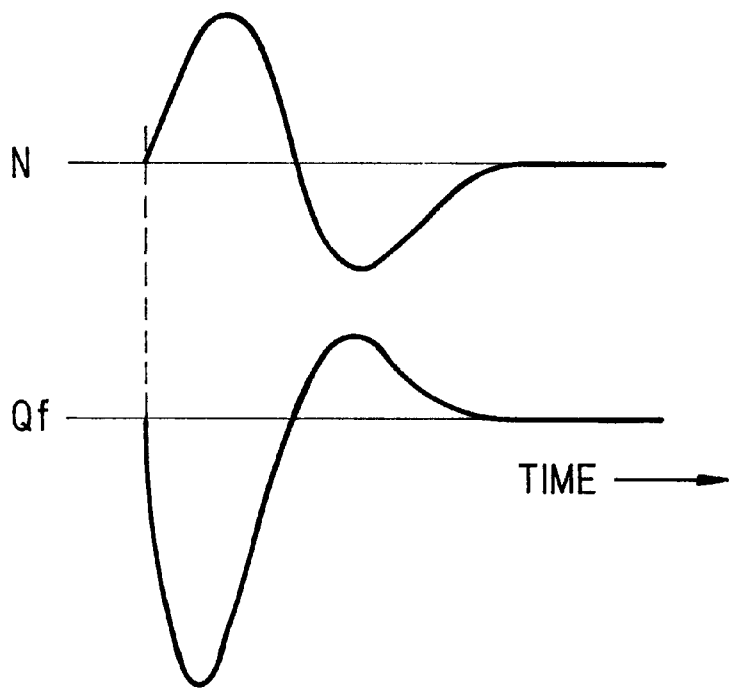
FIG. 3 illustrates characteristic curves showing changes in rotation speed N and changes in fuel flow rate Qf respectively when conducting only air-purge of a fuel injection nozzle.

FIG. 3 illustrates characteristic curves showing changes in the number of revolutions N and changes in the fuel flow rate Qf respectively when changing the combustion mode and simultaneously conducting only air-purge of a used nozzle.

In this instance, the number of revolutions of the engine temporally varies with a change in the fuel flow rate Qf, which is a result of purging residue gas from the gallery of the line of the nozzle 4 into the gas combustion chamber 7.

Figure 4:
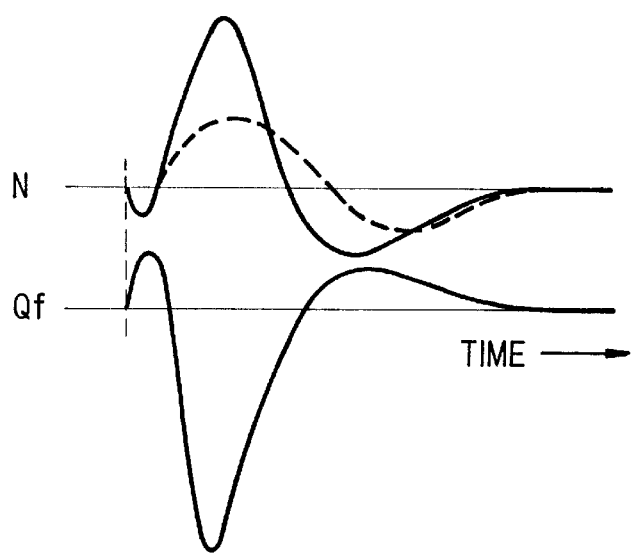
FIG. 4 illustrates characteristic curves showing changes in rotation speed N and changes in fuel flow rate Qf respectively when changing the combustion mode from the diffuse combustion to the premixed combustion with simultaneous air-purge of a fuel injection nozzle.

FIG. 4 illustrates characteristic curves showing changes in the number of revolutions N of the engine and changes in the fuel flow rate Qf respectively when changing the combustion mode from the diffuse combustion to the premixed combustion with simultaneous air-purging of the used fuel-injection nozzle 4 for which the fuel supply has just been shut off.

In this instance, a change in the rotation speed N of the engine and a change in the fuel flow rate Qf are increased respectively because both variations caused by changing the stage and by conducting air-purging are synthesized.

Figure 5:
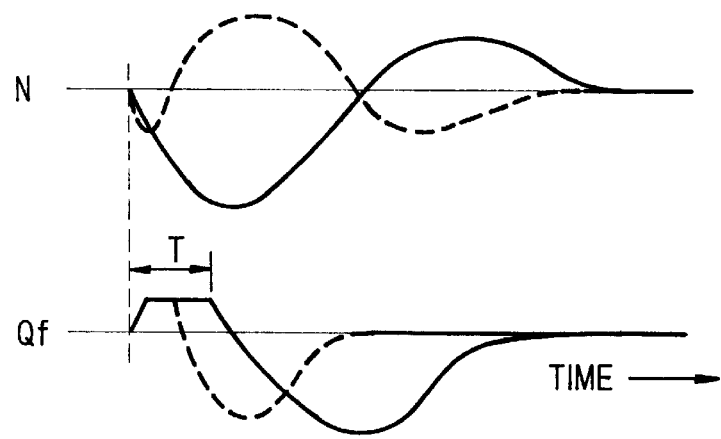
FIG. 5 illustrates characteristic curves showing changes in rotation speed N and changes in fuel flow rate Qf respectively when changing the combustion mode from the diffuse combustion to the premixed combustion without air-purge of a fuel injection nozzle and with restricting the fuel flow rate to a certain degree for a certain period thereafter.

FIG. 5 illustrates characteristic curves showing changes in the number of revolution N of the engine and changes in the fuel flow rate Qf respectively when changing the combustion mode from the diffuse combustion to the premixed combustion without conducting air-purge of a used nozzle 4 but with restricting the flow rate Qf of fuel to a usable nozzle 5 to a certain degree for a certain period thereafter in order to delay the start of changing the rotation speed of the engine by a specified time.

Figure 6:
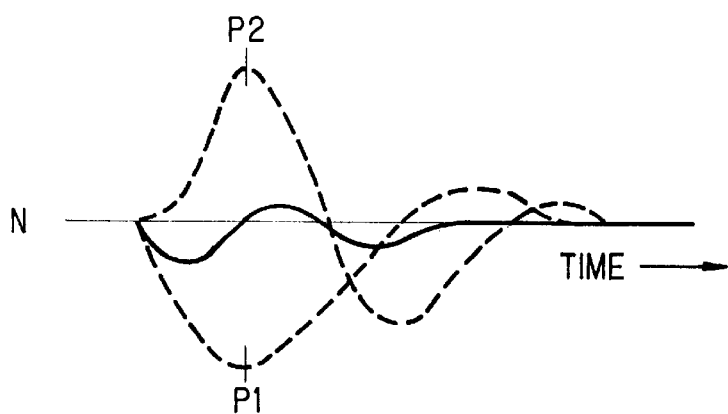
FIG. 6 illustrates characteristic curves showing changes in rotation speed N when changing the combustion mode from the diffuse combustion to the premixed combustion with simultaneously conducting air-purge of a used fuel injection nozzle and restricting the fuel flow rate to a usable nozzle to a certain degree for a certain period thereafter.

FIG. 6 illustrates characteristic curves showing changes in the number of revolutions N when changing the combustion mode from the diffuse combustion to the premixed combustion by simultaneously conducting air-purging of a used nozzle 4 (for diffuse combustion) and by restricting the flow rate Qf of fuel to a current nozzle 5 (for premix combustion) to a certain degree for a certain period thereafter.

In this instance, the period T of restricting the flow rate Qf of fuel to the nozzle 5 for premix combustion after changing the combustion mode from the diffuse combustion to the premix combustion is determined in such a way that the occurrence of a peak point p1 of a change in rotation speed N of the engine forcibly delayed by the above fuel-supply restriction coincides with the occurrence of a peak point p2 of a change in rotation speed of the engine when conducting only air-purge of the used nozzle. The restriction degree of the flow rate Qf is then determined in such a way that both peak points p1 and p2 have the substantially same amplitude. Both changes can now cancel each other, resulting in minimizing the variation in the number of revolutions of the engine when changing the combustion stage from diffuse combustion to the premixed combustion with simultaneous air-purging of the used nozzle 4.

This is the same in the case of changing the combustion mode from the premix combustion to the diffuse combustion with the engine having turned its working state from the normal state to a low-speed low-load state. In this instance, the variation of rotation speed of the engine is suppressed by feedback rotation-speed control since the air purge has a slow-response.

Figure 7:
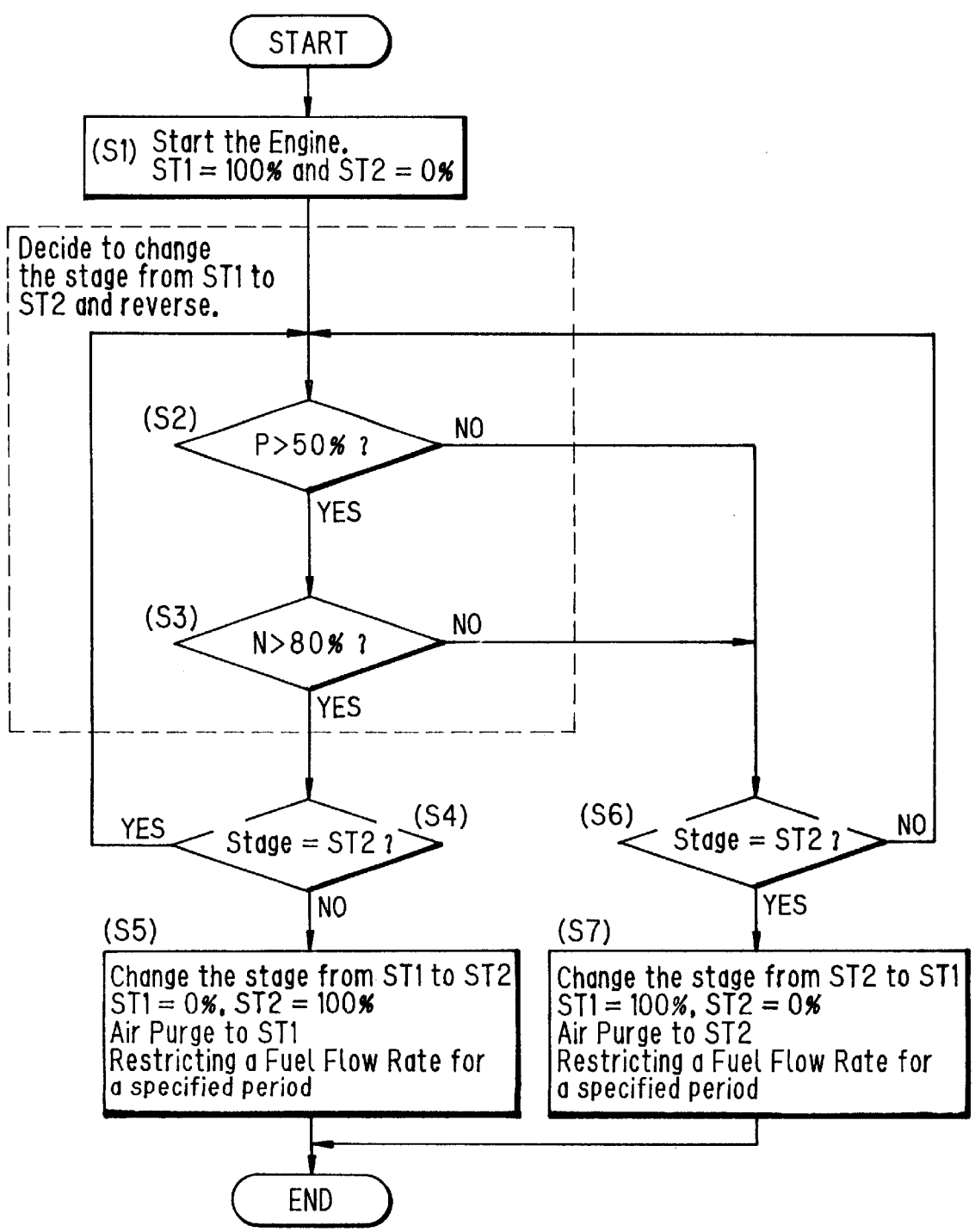
FIG. 7 is a flow chart depicting an actual procedure to be executed by an ECU when carrying out the present invention.

FIG. 7 is a flow chart depicting an actual procedure to be executed by an ECU when carrying out the present invention.

Now, it is assumed that the diffuse combustion is the first stage ST1 and the premixed combustion stage is the second stage ST2. The diffuse combustion process begins with the measuring system set to ST1=100% and ST2=0% (Step S1 in FIG. 7).

At steps S2 and S3, an output P and a rotation speed (the number of revolutions) N after completion of start operation of the engine are examined. Namely, the output P is checked whether it exceeds 50% of the rated load (Step S2). If P>50%, then the number of revolutions N is examined whether it exceeds 80% of the rated speed (Step S3). If N>80%, it is decided that the first stage ST1 must be changed to the second stage ST2.

The current stage is then examined whether it is not changed to the second stage ST2 (Step 4). If the current stage is still the first stage ST1 and not the second stage ST, it is changed to the second stage S2 with the measuring system set to ST1=0% and ST2-100% (Step S5).

Simultaneously with changing to the second stage ST2, the nozzle 4 used for injection of the diffuse combustion fuel is air-purged and the flow rate of the fuel being supplied for premixed combustion is restricted for a specified period thereafter.

If the current stage is already the second stage ST2 (normal operating state) at Step S4, the control returns to Steps S2 and S3 to monitor the output P and the number of revolutions N of the engine.

If the output P falls to 50% of the rated load or less (Step S2) or the number of revolutions N decreasess to 80% of the rated speed or less (Step S3), the current stage is examined whether it is the second stage ST2 (Step S6). If so, the current stage is changed to the first stage ST1 with the measuring system set to ST1=100% and ST2=0%.

Simultaneously with changing to the first stage ST1, the nozzle 5 used for injection of the premixed combustion fuel is air-purged and the flow rate of fuel for diffuse combustion is restricted for a specified period thereafter.

If the current stage is already the second stage ST2 (low-speed low-load operating state) at Step S6, the control returns to Steps S2 and S3 to monitor the output P and the number of revolutions N of the engine.

As is apparent from the foregoing, the gas turbine engine of the present invention, which is capable of changing from the first stage for feeding a specified flow of diffuse-combustion fuel into the combustion chamber through the first injection nozzle to the second stage for feeding a specified flow of premixed combustion fuel into the combustion chamber through the second injection nozzle and reverse in accord with the number of revolutions or the load state of the.engine, offers an advantage of effectively preventing variation in rotation speed of the engine when changing the first stage of diffuse combustion to the second stage of premixed combustion and reverse by using means for conducting air-purging of the nozzle of the fuel cut-off line simultaneously with the stage-changing operation and means for restricting the flow rate of fuel to the nozzle of the working line for a specified period.

What is claimed is:

1. A gas turbine engine having a first stage of supplying diffuse-combustion fuel at a specified flow rate to a combustion chamber through a first injection nozzle and a second stage of supplying premixed combustion fuel at a specified flow rate to the combustion chamber through a second injection nozzle, which is provided with a stage changing means for changing combustion mode from the first stage to the second stage and reverse in accord with a rotation speed and load conditions of the engine.

* * * * *